(12) United States Patent
Hasegawa et al.

(10) Patent No.: US 11,011,810 B2
(45) Date of Patent: May 18, 2021

(54) STACKED BATTERY

(71) Applicant: TOYOTA JIDOSHA KABUSHIKI KAISHA, Toyota (JP)

(72) Inventors: Hajime Hasegawa, Susono (JP); Norihiro Ose, Sunto-gun (JP); Shigenori Hama, Sunto-gun (JP); Hideaki Nishimura, Sunto-gun (JP); Yuki Matsushita, Atsugi (JP); Yusuke Okuhata, Susono (JP); Mitsuru Tateishi, Susono (JP); Hideyo Ebisuzaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 275 days.

(21) Appl. No.: 15/952,821

(22) Filed: Apr. 13, 2018

(65) Prior Publication Data
US 2018/0315984 A1 Nov. 1, 2018

(30) Foreign Application Priority Data
Apr. 28, 2017 (JP) .............................. JP2017-090009

(51) Int. Cl.
| | |
|---|---|
| *H01M 50/572* | (2021.01) |
| *H01M 50/54* | (2021.01) |
| *H01M 50/531* | (2021.01) |
| *H01M 2/34* | (2006.01) |
| *H01M 2/26* | (2006.01) |
| *H01M 2/22* | (2006.01) |
| *H01M 10/04* | (2006.01) |
| *H01M 10/0585* | (2010.01) |

(Continued)

(52) U.S. Cl.
CPC ..... *H01M 50/572* (2021.01); *H01M 10/0472* (2013.01); *H01M 50/531* (2021.01); *H01M 50/54* (2021.01); *H01M 10/0525* (2013.01); *H01M 10/0562* (2013.01); *H01M 10/0585* (2013.01); *H01M 2200/00* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2010/0159315 A1 | 6/2010 | Imasaka et al. | |
| 2015/0357622 A1* | 12/2015 | Mune | H01G 11/50 429/163 |
| 2016/0006013 A1 | 1/2016 | Shen et al. | |

FOREIGN PATENT DOCUMENTS

| | | |
|---|---|---|
| JP | 11-097066 A | 4/1999 |
| JP | 2001-297795 A | 10/2001 |
| JP | 2003045410 A | 2/2003 |

(Continued)

OTHER PUBLICATIONS

English translation of JP 2014/107144 (Year: 2014).*

Primary Examiner — Yoshitoshi Takeuchi
(74) Attorney, Agent, or Firm — Sughrue Mion, PLLC

(57) ABSTRACT

Disclosed is a stacked battery that can flow a larger rounding current in a short-circuit current shunt part than in an electric element when a short circuit occurs in the short-circuit current shunt part and the electric element in nailing, the stacked battery in which an electrical resistance of a current collector tab of the short-circuit current shunt part is smaller than an electrical resistance of a current collector tab of the electric element.

7 Claims, 9 Drawing Sheets

(51) Int. Cl.
  *H01M 10/0525*  (2010.01)
  *H01M 10/0562*  (2010.01)

(56) References Cited

FOREIGN PATENT DOCUMENTS

| | | | | |
|---|---|---|---|---|
| JP | 3524744 | B2 | 5/2004 | |
| JP | 2009-087600 | A | 4/2009 | |
| JP | 2014/107144 | * | 6/2014 | ............ H01G 11/22 |
| JP | 2014143007 | A | 8/2014 | |
| JP | 2015-156323 | A | 8/2015 | |
| JP | 2015176701 | A | 10/2015 | |
| JP | 6027262 | B2 | 11/2016 | |

* cited by examiner

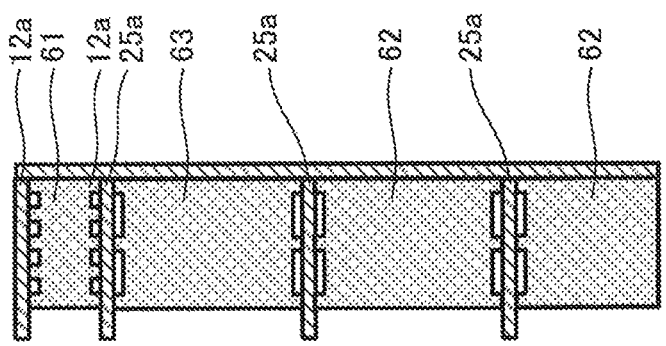
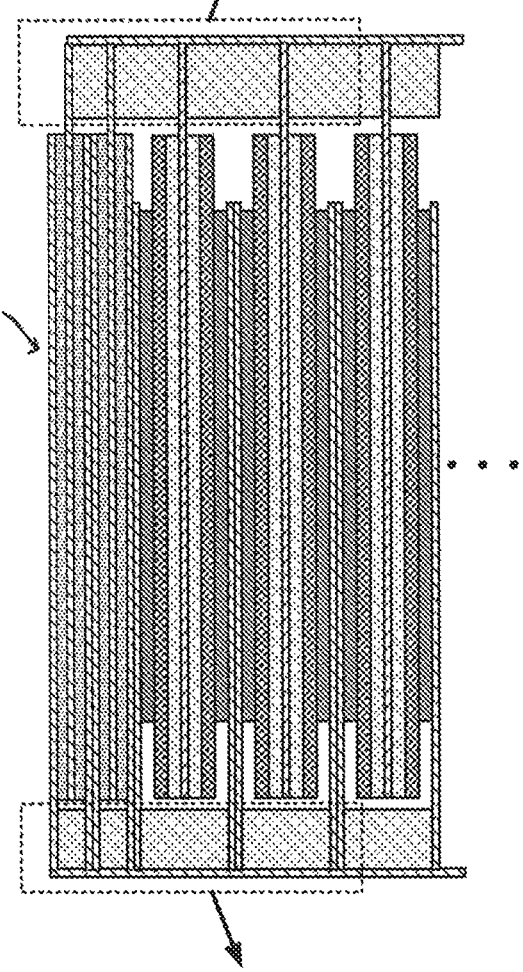
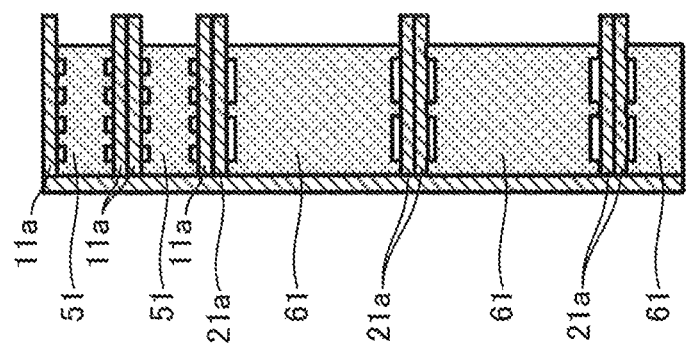

STACKED BATTERY

FIELD

The present disclosure relates to a stacked battery.

BACKGROUND

Nailing test has been known as a test for evaluating safety of batteries when the batteries are damaged by an external object. In the nailing test, a conductive nail penetrates a battery, and a temperature increase etc. are observed when an internal short circuit occurs in the electric element in the battery.

Patent Literature 1 discloses a battery including a protective element that consists of two insulating layers and a conductive layer provided between the insulating layers, the element being provided outside an electric element. In Patent Literature 1, the protective element functions as an antecedent short-circuit layer in nailing. That is, the protection element has a short circuit before the electric element does, to proceed discharge of the electric element before the electric element has a short circuit. This results in an inhibition of a temperature increase inside the electric element. Patent Literatures 2 to 4 also disclose various techniques to inhibit heat generation due to an internal short circuit in battery.

CITATION LIST

Patent Literature

Patent Literature 1: JP6027262 B2
Patent Literature 2: JP H11-097066 A
Patent Literature 3: JP 2009-087600 A
Patent Literature 4: JP 2015-156323 A

SUMMARY

Technical Problem

The inventors of the present application faced the following problems. In a stacked battery in which a plurality of electric elements are stacked and electrically connected in parallel, electrons flow into some electric elements from other electric elements, when some electric elements have a short circuit in nailing (hereinafter, this flow of electrons may be referred to as "rounding current"). This increases the temperature of some electric elements locally, resulting in a deterioration of the battery materials. For example, when a nail penetrates a plurality of electric elements, some electric elements are small in short-circuit resistance, and others (including electric element that does not have a short circuit) are large in short-circuit resistance, which causes a rounding current to concentrate to the electric elements that are small in short-circuit resistance.

Solution to Problem

The inventors of the present disclosure carried out intensive studies regarding means for solving the above problems, and they found the followings.
(1) It is possible to inhibit a local temperature increase of some electric elements in a stacked battery, by providing a short-circuit current shunt part separately from the electric elements, and making the short-circuit current shunt part have a short circuit together with some electric elements in nailing. Then, a rounding current from other electric elements that are large in short-circuit resistance shunts not only into some electric elements that are small in short-circuit resistance but also into the short-circuit current shunt part that is small in short-circuit resistance.
(2) When a short circuit occurs in nailing, the smaller the resistance of the short-circuit current shunt part compared to the resistance of the electric element, the more amount of rounding current can flow into the short-circuit current shunt part compared to the electric element. This inhibits a local temperature increase inside the electric element.
(3) To make the resistance of the short-circuit current shunt part smaller than the resistance of the electric element when a short circuit occurs in nailing, an effective way is to make the electrical resistance of a current collector tab of the short-circuit current shunt part smaller than the electrical resistance of a current collector tab of the electric elements.

Based on the above findings, the present application discloses, as a means for solving the problems, the present application discloses a stacked battery including a stack of: at least one short-circuit current shunt part; and a plurality of electric elements, wherein: the short-circuit current shunt part includes a first current collector layer, a second current collector layer, and an insulating layer provided between the first and second current collector layers, all these layers being stacked each other; the first current collector layer includes a first current collector tab; the second current collector layer includes a second current collector tab; each electric element includes a cathode current collector layer, a cathode material layer, an electrolyte layer, an anode material layer, and an anode current collector layer, all these layers being stacked each other; the cathode current collector layer includes a cathode current collector tab; the anode current collector layer includes an anode current collector tab; the electric elements are connected to each other electrically in parallel by an electrical connection of a plurality of the cathode current collector tabs and an electrical connection of a plurality of the anode current collector tabs; the first current collector layer is electrically connected to the cathode current collector layer via the first current collector tab; the second current collector layer is electrically connected to the anode current collector layer via the second current collector tab; and a sum of an electrical resistance of the first current collector tab and an electrical resistance of the second current collector tab is smaller than a sum of an electrical resistance of the cathode current collector tab and an electrical resistance of the anode current collector tab.

"Electrical resistance of the current collector tab" means, where the current collector tab has a layer on its surface (e.g. a layer formed of a material larger in specific resistance than the current collector tab, and a layer formed of a material same in specific resistance as the current collector tab, which are described later), the electrical resistance as a whole of the current collector tab and the layer.

In the stacked battery of the present disclosure, a specific resistance of the first current collector tab is preferably smaller than a specific resistance of the cathode current collector tab, and a specific resistance of the second current collector tab is preferably smaller than a specific resistance of the anode current collector tab.

In the stacked battery of the present disclosure, the cathode current collector tabs and the anode current collector tabs preferably have portions projecting from the stack; a layer formed of a material larger in specific resistance than the cathode current collector tab is preferably provided between the portions of the cathode current collector tabs; and a layer formed of a material lager in specific resistance than the anode current collector tab is preferably provided between the portions of the anode current collector tabs.

In the stacked battery of the present disclosure, the first current collector tabs and the second current collector tabs preferably have portions projecting from the stack; a layer formed of a same material as the first current collector tab is preferably provided between the portions of the first current collector tabs, and the layer is preferably joined to the first current collector tabs by welding; a layer formed of a same material as the second current collector tab is preferably provided between the portions of the second current collector tabs, and the layer is preferably joined to the second current collector tabs by welding; the cathode current collector tabs and the anode current collector tabs preferably have portions projecting from the stack; a layer formed of a same material as the cathode current collector tab is preferably provided between the portions of the cathode current collector tabs, and the layer is preferably joined to the cathode current collector tabs by welding; a layer formed of a same material as the anode current collector tab is preferably provided between the portions of the anode current collector tabs, and the layer is preferably joined to the anode current collector tabs by welding; an area where the first current collector tab is welded is preferably larger than an area where the cathode current collector tab is welded; and an area where the second current collector tab is welded is preferably larger than an area where the anode current collector tab is welded.

"Welded area" is an area where the current collector tab and the layer formed of the same material as the current collector tab are strongly joined by welding, at the interface between the tab and the layer. That is, the larger the welded area is, the larger the area where the tab and the layer are joined.

In the stacked battery of the present disclosure, the first current collector tab is preferably larger than the cathode current collector tab in thickness, and the second current collector tab is preferably larger than the anode current collector tab in thickness.

In the stacked battery of the present disclosure, the first current collector tab is preferably larger than the cathode current collector tab in width, and the second current collector tab is preferably larger than the anode current collector tab in width.

Advantageous Effects

In the stacked battery of the present disclosure, the electrical resistance of the current collector tab of the short-circuit current shunt part is smaller than the electrical resistance of the current collector tab of the electric element. This can flow a larger amount of rounding current into the short-circuit current shunt part than in the electric element, when a short circuit occurs in the short-circuit current shunt part and the electric element in nailing.

BRIEF DESCRIPTION OF DRAWINGS

FIGS. 6A to 6C are schematic views to explain an example (third embodiment) of the current collector tabs provided to the short-circuit current shunt part 10 and the electric element 20;

DETAILED DESCRIPTION OF EMBODIMENTS

1. Stacked Battery

Figure 1:
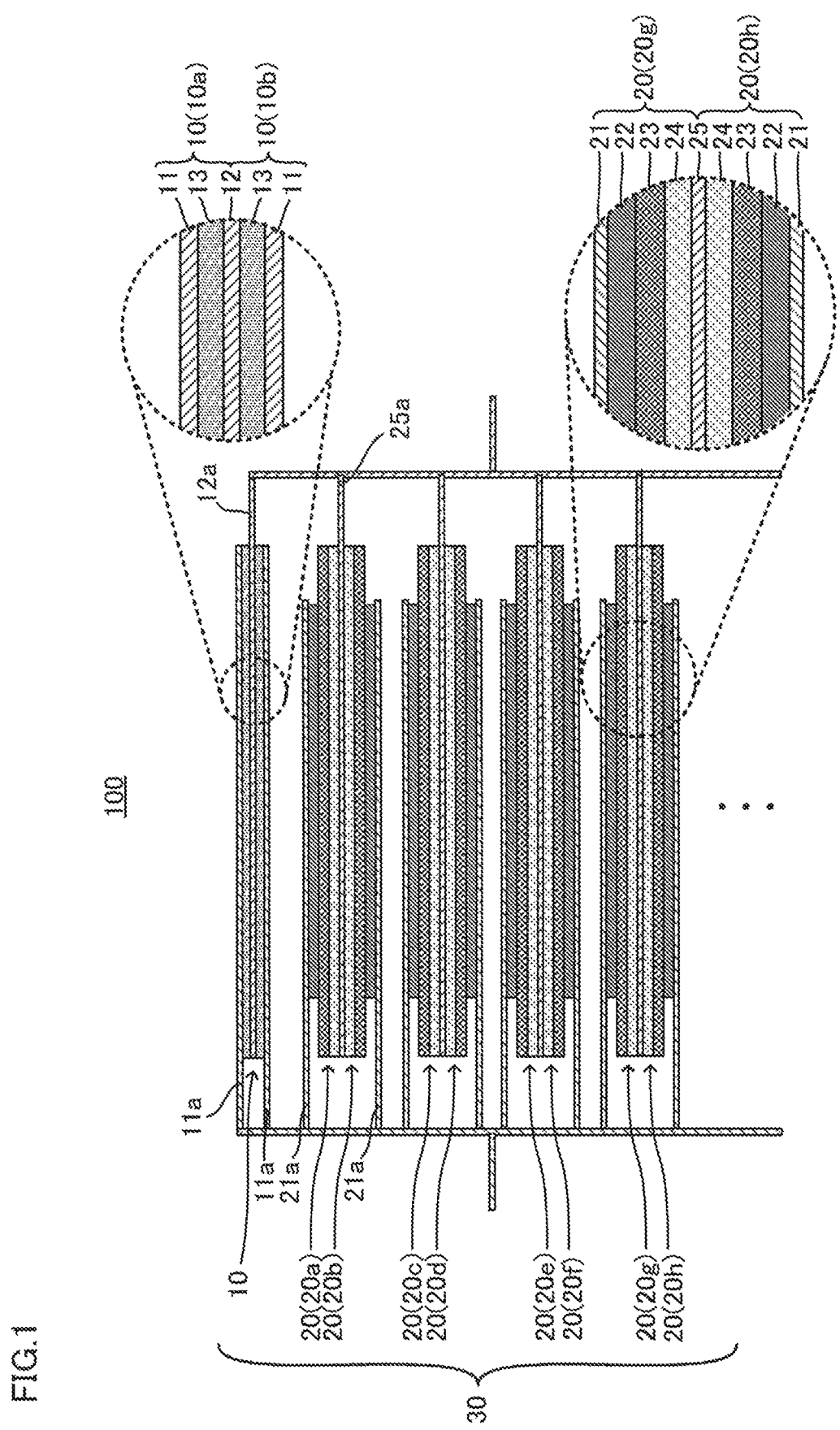
FIG. 1 is a schematic view to explain a layer structure of a stacked battery 100.

FIG. 1 schematically shows a layer structure of a stacked battery 100. Battery case etc. are omitted in FIG. 1 for convenient explanation.

As shown in FIG. 1, the stacked battery 100 comprises a stack 30. The stack 30 includes at least one short-circuit current shunt part 10 and a plurality of electric elements 20, 20, . . . . The short-circuit current shunt part 10 includes a first current collector layer 11, a second current collector layer 12, and an insulating layer 13 provided between the first and second current collector layers 11 and 12, all these layers being stacked each other. The first current collector layer 11 has a first current collector tab 11a. The second current collector layer 12 has a second current collector tab 12a. Each electric element 20 includes a cathode current collector layer 21, a cathode material layer 22, an electrolyte layer 23, an anode material layer 24, and an anode current collector layer 25, all these layers being stacked each other. The cathode current collector layer 21 has a cathode current collector tab 21a. The anode current collector layer 25 has an anode current collector tab 25a. In the stacked battery 100, the cathode current collector tabs 21a, 21a, . . . are electrically connected to each other, and the anode current collector tabs 25a, 25a, . . . are electrically connected to each other, which connects the plurality of electric elements 20, 20, . . . to each other electrically in parallel. The first current collector layer 11 is electrically connected to the cathode current collector layer 21 via the first current collector tab 11a. The second current collector layer 12 is electrically connected to the anode current collector layer 25 via the second current collector tab 12a. A feature of the stacked battery 100 is that the sum of the electrical resistance of the first current collector tab 11a and the electrical resistance of the second current collector tab 12a is smaller than the sum of the electrical resistance of the cathode current collector tab 21a and the electrical resistance of the anode current collector tab 25a.

1.1. Short-Circuit Current Shunt Part 10

The short-circuit current shunt part 10 includes the first current collector layer 11, the second current collector layer 12, and the insulating layer 13 provided between the first and second current collector layers 11 and 12. The short-circuit current shunt part 10 of such a structure properly insulates the first current collector layer 11 and the second current collector layer 12 with the insulating layer 13 in normal use of the battery. When a short circuit occurs in nailing, the first current collector layer 11 and the second current collector layer 12 have contact with each other to reduce the electrical resistance.

1.1.1. First Current Collector Layer 11 and Second Current Collector Layer 12

The first current collector layer 11 and the second current collector layer 12 may be formed of, for example, metal foil, and metal mesh. In particular, metal foil is preferable. Examples of metal to form the current collector layers 11 and 12 include Cu, Ni, Al, Fe, Ti, Zn, Co, Cr, Au, Pt, and stainless steel. The first and second current collector layers 11 and 12 may have a coat layer on their surfaces to control their electrical resistances. Examples of the coat layer include a carbon coat layer.

The thickness of each of the first and second current collector layers 11 and 12 is not limited to particular values. For example, the thickness is preferably 0.1 μm to 1 mm, and more preferably 1 μm to 100 μm. The current collector layer 11 and 12 of these ranges of thickness can more properly contact with each other in nailing, and can further decrease the short-circuit resistance of the short-circuit current shunt part 10.

The first current collector layer 11 has the current collector tab 11a, and the second current collector layer 12 has the current collector tab 12a. As described later, the current collector tab 11a electrically connects the first current collector layer 11 to the cathode current collector layer 21 of the electric element 20, and the current collector tab 12a electrically connects the second current collector layer 12 to the anode current collector layer 25 of the electric element 20. The material of the first current collector tab 11a may be the same as or different from the material of the first current collector layer 11. The material of the second current collector tab 12a may be the same as or different from the material of the second current collector layer 12. The thickness of the first current collector tab 11 may be the same as or different from the thickness of the first current collector tab 11. The thickness of the second current collector tab 12a may be the same as or different from the thickness of the second current collector layer 12. In any case, the important thing in the stacked battery 100 of the present disclosure is that the sum of the electrical resistance of the first current collector tab 11a and the electrical resistance of the second current collector tab 12a is smaller than the sum of the electrical resistance of the cathode current collector tab 21a and the electrical resistance of the anode current collector tab 25a, in view of making a larger amount of rounding current flow into the short-circuit current shunt part 10 than in the electric element in nailing. The structure of each current collector tab will be described later in detail.

1.1.2. Insulating Layer 13

The insulating layer 13 of the stacked battery 100 may be formed of any material that insulates the first current collector layer 11 and the second current collector layer 12 in normal use of the battery. The insulating layer 13 may be formed of an organic material, an inorganic material, or a mixture of an organic material and an inorganic material. In particular, the insulating layer is preferably formed of an organic material. This is because organic materials have an advantage of low probability of short circuit due to cracking in normal use.

Examples of the organic material that can form the insulating layer 13 include various resins. For example, various thermoplastic resins and various thermosetting resins may be used. In particular, thermosetting resins, such as polyimide, are preferable. Thermosetting resins typically have higher thermal stability than thermoplastic resins, and hard and brittle. Thus, when the insulating layer 13 is formed of a thermosetting resin, the insulating layer 13 easily breaks when a nail penetrates the short-circuit current shunt part 10, which can inhibit the insulating layer 13 from following deformations of the first current collector layer 11 and the second current collector layer 12, and can make the first current collector layer 11 and the second current collector layer 12 contact with each other more easily. In addition, thermal cracking of the insulating layer 13 may be inhibited even when the temperature of the insulating layer 13 excessively increases.

Examples of the inorganic material that can form the insulating layer 13 include various ceramics. For example, inorganic oxides may be used. The insulating layer 13 may also be formed of a metal foil having an oxide coating on its surface. For example, an aluminum foil having an oxide aluminum coating on its surface may be obtained by forming an anode oxide coating on the surface of the aluminum foil, by alumite treatment. In this case, the thickness of the oxide coating is preferably 0.01 μm to 5 μm. The lower limit is more preferably no less than 0.1 μm, and the upper limit is more preferably no more than 1 μm.

The thickness of the insulating layer 13 is not limited to particular values. For example, the thickness is preferably 0.1 μm to 1 mm, and more preferably 1 μm to 100 μm. The insulating layer 13 of such ranges of thickness can more properly insulate the first current collector layer 11 and the second current collector layer 12 in normal use of the battery, and can more properly make the first and second current collector layers 11 and 12 conducted with each other when they deform due to external stress such as nailing, to make an internal short circuit in the first and second current collector layers 11 and 12.

1.2. Electric Element 20

The electric element 20 includes a cathode current collector layer 21, a cathode material layer 22, an electrolyte layer 23, an anode material layer 24, and an anode current collector layer 25 stacked each other. That is, the electric element 20 may function as a single battery.

1.2.1. Cathode Current Collector Layer 21

The cathode current collector layer 21 may be formed of, for example, metal foil, and metal mesh. In particular, metal foil is preferable. Examples of metal to form the cathode current collector layer 21 include Ni, Cr Au, Pt, Al, Fe, Ti, Zn and stainless steel. The cathode current collector layer 21 may have a coat layer on its surface to control the electrical resistance. Examples of the coat layer include a carbon coat layer. The thickness of the cathode current collector layer 21 is not limited to particular values. For example, the thickness is preferably 0.1 μm to 1 mm, and more preferably 1 μm to 100 μm.

The cathode current collector layer 21 has the cathode current collector tab 21a. The cathode current collector tab 21a can easily connect the cathode current collector layers 21, 21, ... to each other electrically in parallel. The material of the cathode current collector tab 21a may be the same as or different from the material of the cathode current collector layer 21. The thickness of the cathode current collector tab 21a may be the same as or different from the thickness of the cathode current collector layer 21. The structure of the cathode current collector tab 21a will be described later in detail.

1.2.2. Cathode Material Layer 22

The cathode material layer 22 at least includes an active material. When the stacked battery 100 is an all-solid-state battery, the cathode material layer 22 may optionally include a solid electrolyte, a binder, a conductive assistant, etc., in addition to the active material. When the stacked battery 100 is an electrolyte solution battery, the cathode material layer 22 may optionally include a binder, a conductive assistant, etc., in addition to the active material. Known active materials may be used as the active material. Among known active materials, two materials of different potentials at which predetermined ions are absorbed and released (charge-discharge potential) may be selected, and from the two materials, a material having the nobler potential may be used as a cathode active material, and a material having the baser potential may be used as an anode active material which is described later. For example, when a lithium ion battery is formed, various lithium-containing composite oxides, such as lithium cobalt oxide, lithium nickel oxide, $LiNi_{1/3}Co_{1/3}Mn_{1/3}O_2$, lithium manganese oxide, and spinel type lithium compounds, may be used as the cathode active material. When the stacked battery 100 is an all-solid-state battery, the surface of the cathode active material may be coated with an oxide layer, such as lithium niobate layer, lithium titanate layer, and lithium phosphate layer. When the stacked battery 100 is an all-solid-state battery, the solid electrolyte is preferably an inorganic solid electrolyte. This is because inorganic solid electrolytes have high ion conductivity and excellent in heat resistance, compared to organic polymer electrolytes. Further, inorganic solid electrolytes are preferable because the pressure applied to the electric element 20 is high in nailing and then the effect of the stacked battery 100 of the present application is remarkably exerted with inorganic solid electrolytes, compared to a case where an organic polymer electrolyte is used. Examples of the inorganic solid electrolyte include oxide solid electrolytes such as lithium lanthanum zirconate, and sulfide solid electrolytes such as $Li_2S$—$P_2S_5$. In particular, a sulfide solid electrolyte that contains $Li_2S$—$P_2S_5$ is preferable, and a sulfide solid electrolyte that contains no less than 50 mol % of $Li_2S$—$P_2S_5$ is more preferable. As the binder, various types of binders, such as butadiene rubber (BR), acrylate butadiene rubber (ABR), and polyvinylidene fluoride (PVdF), may be used. Examples of the conductive assistant include carbon materials such as acetylene black and Ketjen black, and metal materials such as nickel, aluminum, and stainless steel. The content of each component of the cathode material layer 22 may be the same as before. The shape of the cathode material layer 22 may also be the same as before. In particular, the cathode material layer 22 formed into a sheet is preferable, in view of easily forming the stacked battery 100. In this case, the thickness of the cathode material layer 22 is for example preferably 0.1 μm to 1 mm, and more preferably 1 μm to 150 μm.

1.2.3. Electrolyte Layer 23

The electrolyte layer 23 at least includes an electrolyte. When the stacked battery 100 is an all-solid-state battery, the electrolyte layer 23 may contain a solid electrolyte and may optionally contain a binder. The solid electrolyte is preferably selected from the above-mentioned inorganic solid electrolytes. The binder may be adequately selected from the binders that may be used for the cathode material layer 22. The content of each component of the solid electrolyte layer 23 may be the same as before. The shape of the solid electrolyte layer 23 may also be the same as before. In particular, the solid electrolyte layer 23 formed into a sheet is preferable, in view of easily forming the stacked battery 100. In this case, the thickness of the solid electrolyte layer 23 is for example preferably 0.1 μm to 1 mm, and more preferably 1 μm to 100 μm. When the stacked battery 100 is an electrolyte solution battery, the electrolyte layer 23 includes an electrolyte solution and a separator. The electrolyte solution and separator are obvious to those skilled in the art, and their detailed explanations are omitted here.

1.2.4. Anode Material Layer 24

The anode material layer 24 at least includes an active material. When the stacked battery 100 is an all-solid-state battery, the anode material layer 24 may optionally include a solid electrolyte, a binder, a conductive assistant, etc., in addition to the active material. When the stacked battery 100 is an electrolyte solution battery, the anode material layer 24 may optionally include a binder, a conductive assistant, etc., in addition to the active material. Known active materials may be used as the active material. Among known active materials, two materials of different potentials at which predetermined ions are absorbed and released (charge-discharge potential) may be selected, and from the two materials, the material having the nobler potential may be used as the above-described cathode active material, and the material having the baser potential may be used as the anode active material. For example, when a lithium ion battery is formed, examples of the anode active material include carbon materials such as graphite and hard carbon, various oxides such as lithium titanate, Si, Si alloy, lithium metal, and lithium alloy. The solid electrolyte, the binder, and the conductive assistant in the anode material layer 24 may be adequately selected from the solid electrolytes, the binders, and the conductive assistants that may be used for the cathode material layer 22. Each content of the components in the anode material layer 24 may be the same as before. The shape of the anode material layer 24 may also be the same as before. In particular, the anode material layer 24 formed into a sheet is preferable, in view of easily forming the stacked battery 100. In this case, the thickness of the anode material layer 24 is, for example, preferably 0.1 μm to 1 mm, and more preferably 1 to 100 μm. It is noted that the thickness of the anode material layer 24 may be preferably determined such that the volume of the anode is larger than the volume of the cathode.

1.2.5. Anode Current Collector Layer 25

The anode current collector layer 25 may be formed of, for example, metal foil, and metal mesh. In particular, metal foil is preferable. Examples of metal to form the anode current collector layer 25 include Cu, Ni, Fe, Ti, Co, Zn, and stainless steel. The anode current collector layer 25 may have a coat layer on its surface to control its contact resistance. Examples of the coat layer include a carbon coat layer. The thickness of the anode current collector layer 25 is not limited to particular values. For example, the thickness is preferably 0.1 μm to 1 mm, and more preferably 1 μm to 100 μm.

The anode current collector layer 25 has the anode current collector tab 25a. The anode current collector tab 25a can easily connect the anode current collector layer 25, 25, . . . to each other electrically in parallel. The material of the anode current collector tab 25a may be same as or different from the material of the anode current collector layer 25. The thickness of the anode current collector tab 25a may be the same as or different from the thickness of the anode current collector layer 25a. The structure of the anode current collector tab 25 will be described later in detail.

1.3. Arrangement and Connection State of Short-Circuit Current Shunt Part and Electric Elements

1.3.1. Number and Arrangement of Electric Elements

The number of the electric elements 20, 20, . . . stacked in the stacked battery 100 is not limited to particular values.

The number may be properly determined depending on aimed battery power. In this case, the plurality of electric elements 20, 20, . . . may be stacked in a manner to directly contact with each other, and may be stacked via another layer (e.g. insulating layer) or gap (air layer). For convenient explanation, gaps are created between the electric element 20b and the electric element 20c, between the electric element 20d and the electric element 20e, and between the electric element 20f and the electric element 20g in FIG. 1. However, there is no need of gaps between the electric elements. In view of improving the output density of the battery, the electric elements 20, 20, . . . are preferably stacked in a manner to directly contact with each other. In addition, as shown in FIG. 1, two of the electric elements 20a and 20b preferably share one anode current collector layer 25. This further improves the output density of the battery. Further, as shown in FIG. 1, a direction of stacking the electric elements 20, 20, . . . and a direction of stacking the layers 21 to 25 in each electric element 20 are preferably the same in the stacked battery 100. This easily bundles the stacked battery 100, resulting in a further improvement of the output density of the battery.

1.3.2. Electrical Connection of Electric Elements

In the stacked battery 100, the electric elements 20, 20, . . . are connected to each other electrically in parallel by an electrical connection of the cathode current collector tabs 21a, 21a, . . . to each other and an electrical connection of the anode current collector tabs 25a, 25a, . . . to each other. When one of the electric elements having such a parallel connection short-circuits, electrons concentrate to the short-circuited electric element from other electric elements. That is, such electric elements having a parallel connection easily have a large Joule heat when the battery short-circuits. In other words, the above-mentioned problems may occur in the stacked battery 100 including the plurality of electric elements 20, 20, . . . that have such an electrically parallel connection.

1.3.3. Electrical Connection Between Short-Circuit Current Shunt Part and Electric Elements In the stacked battery 100, the first current collector layer 11 of the short-circuit current shunt part 10 is electrically connected to the cathode current collector layer 21 of the electric element 20 via the first current collector tab 11a, and the second current collector layer 12 of the short-circuit current shunt part 10 is electrically connected to the anode current collector layer 25 of the electric element 20 via the second current collector tab 12a. When a short circuit occurs in the short-circuit current shunt part 10 and some of the electric elements (e.g. electric element 20a), a large amount of rounding current can flow from other electric elements (e.g. electric element 20b) to the short-circuit current shunt part 10, by electrically connecting the short-circuit current shunt part 10 and the electric element 20 as described above.

1.3.4. Collection and Bundling of Tabs

In FIG. 1, the current collector tabs are indirectly connected to each other by conductive materials that extend in the vertical direction of the sheet, for convenient explanation. However, the current collector tabs may be directly connected to each other by collecting and bundling the tabs, without using such conductive materials. That is, the current collector tabs 11a and 21a may be collected and bundled in one place. The current collector tabs 12a and 25a may also be collected and bundled in one place. How to collect and bundle the tabs is obvious for those skilled in the art, and detailed explanations thereof are omitted here.

1.3.5. Positional Relationship Between Short-Circuit Current Shunt Part and Electric Elements At least one short-circuit current shunt part 10 and the electric elements 20, 20, . . . only need to be stacked each other. The short-circuit current shunt part 10 and the electric elements may be directly stacked, and may be indirectly stacked via another layer (e.g. insulating layer, and heat-insulating layer). The short-circuit current shunt part 10 may be stacked outside the electric elements 20, 20, . . . , may be stacked between the electric elements 20, 20, . . . , and may be stacked both outside and between the electric elements 20, 20, . . . . In particular, as shown in FIG. 1, when the short-circuit current shunt part 10 and the electric elements 20, 20, . . . are stacked, the short-circuit current shunt part 10 is preferably located at least outside the electric elements 20, 20, . . . . By this, a short circuit occurs in the short-circuit current shunt part 10 before in the electric elements 20, 20, . . . in nailing, and then a rounding current flows from the electric elements 20, 20 . . . to the short-circuit current shunt part 10, which inhibits a heat generation inside the electric elements 20, 20, . . . .

A short circuit easily occurs in the battery in nailing when a nail penetrates in a direction from the cathode current collector layer 21 toward the anode current collector layer 25 of the electric element 20 (or, from the anode current collector layer 25 to the cathode current collector layer 21). That is, in the stacked battery 100, the direction of nailing and the direction of stacking each layer are preferably the same. In more detail, in the stacked battery 100, a direction of stacking the cathode current collector layer 21, the cathode material layer 22, the electrolyte layer 23, the anode material layer 24, and the anode current collector layer 25 in each electric element 20, a direction of stacking the electric elements 20, 20, . . . , a direction of stacking the first current collector layer 11, the insulating layer 13, and the second current collector layer 12 of the short-circuit current shunt part 10, and a direction of stacking the short-circuit current shunt part 10 and the electric elements 20, 20, . . . are preferably the same. Such a structure exerts more remarkable effect.

1.3.6. Relationship Between Short-Circuit Current Shunt Part and Electric Elements in Size In the stacked battery 100, making the short-circuit current shunt part 10 cover as much part of the electric element 20 as possible can easily make a short circuit in the short-circuit current shunt part 10 before in the electric element 20 in nailing. In this viewpoint, in the stacked battery 100 for example, an outer edge of the short-circuit current shunt part 10 is preferably located outside the outer edges of the electric elements 20, 20, . . . , when seen from the direction of stacking the short-circuit current shunt part 10 and the electric elements 20, 20, . . . . Or, as shown in FIG. 1, when the direction of stacking the electric elements 20, 20, . . . and the direction of stacking the layers 21 to 25 of each electric element 20 are the same, the outer edge of the short-circuit current shunt part 10 is preferably located outside the outer edges of the cathode material layer 22, the electrolyte layer 23, and the anode material layer 24, when seen from the direction of stacking the short-circuit current shunt part 10 and the electric elements 20, 20, . . . . It is noted, in this case, the first current collector layer 11 of the short-circuit current shunt part 10 and the anode current collector layer 25 of the electric element 20 must not have a short circuit. That is, an insulator or the like is provided between the short-circuit current shunt part 10 and the electric element 20, to avoid a short circuit between the short-circuit current shunt part 10 and the electric element 20, even though the short-circuit current shunt part 10 is made large.

On the other hand, the short-circuit current shunt part 10 is preferably made as small as possible, in view of more increasing the energy density of the battery and in view of easily prevent a short circuit between the short-circuit current shunt part 10 and the electric element 20. That is, in these viewpoints, in the stacked battery 100, the outer edge of the short-circuit current shunt part 10 is preferably provided inside the outer edges of the electric elements 20, 20, . . . , when seen from the direction of stacking the short-circuit current shunt part 10 and the electric elements 20, 20, . . . . Or, when the direction of stacking the electric elements 20, 20, . . . and the direction of stacking the layers 21 to 25 of each electric element 20 are the same, the outer edge of the short-circuit current shunt part 10 is preferably provided inside the outer edges of the cathode material layer 22, the electrolyte layer 23, and the anode material layer 24, when seen from the direction of stacking the short-circuit current shunt part 10 and the electric elements 20, 20, . . . .

1.4. Function and Effect of Stacked Battery 100

Figure 2:
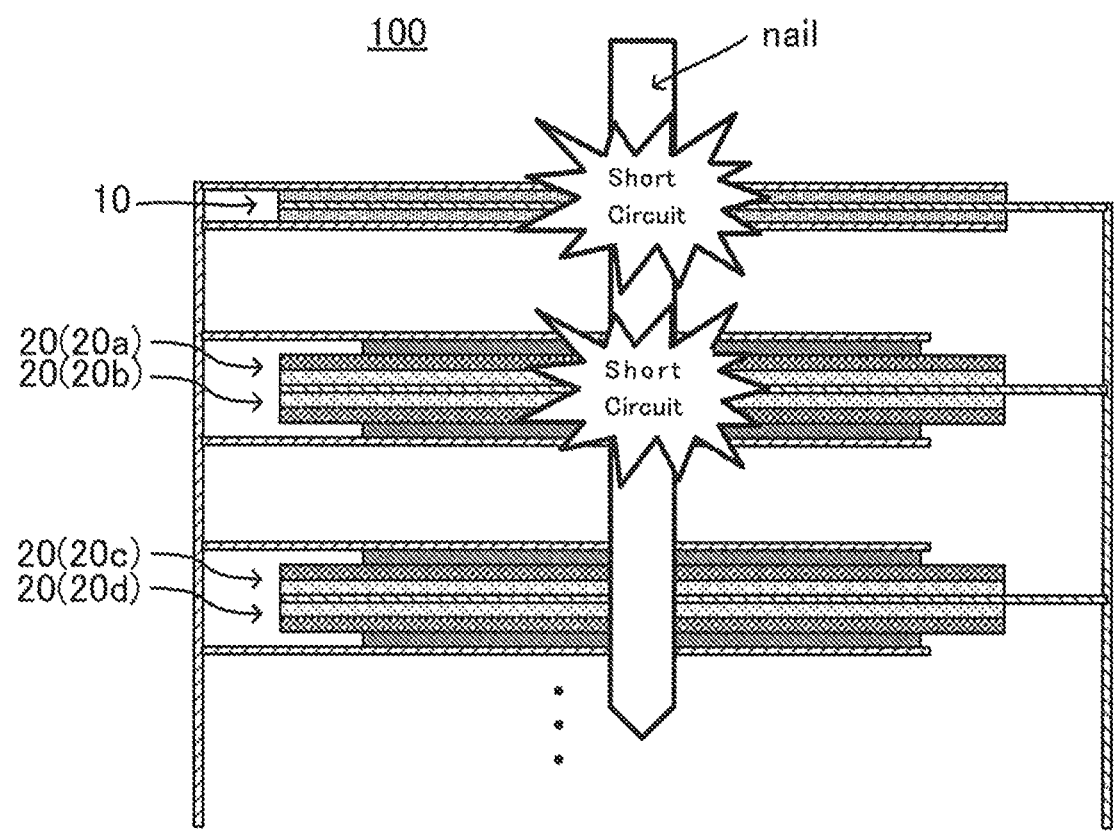
FIG. 2 is a schematic view to explain an example of a state of internal short circuit in the stacked battery 100 in nailing.
Figure 3:
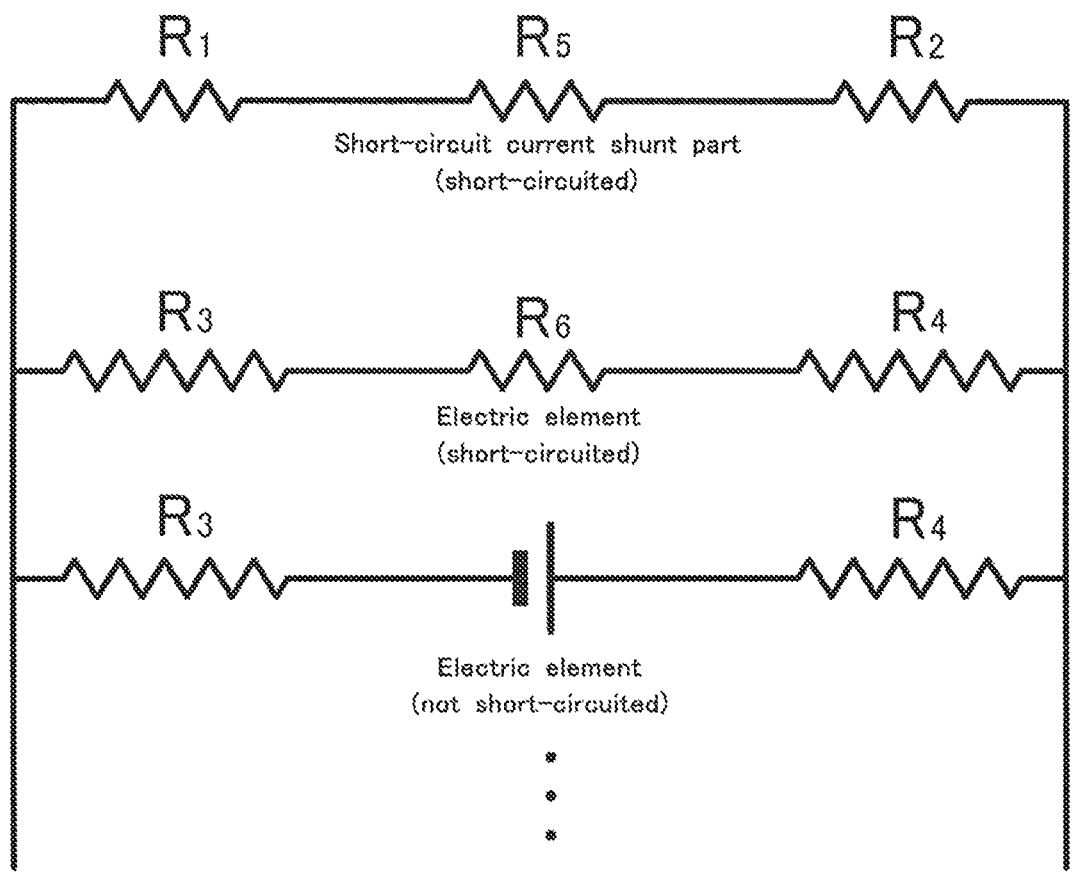
FIG. 3 is a schematic view to explain an example of equivalent circuit of the stacked battery 100 in nailing.

The functions and effects of the stacked battery 100 will be explained in more detail, with reference to FIGS. 2 and 3. When the staked battery 100 is nailed in FIGS. 2 and 3, it is assumed that a short circuit occurs between the short-circuit current shunt part 10 and the electric elements 20a and 20b, and the electric elements 20c and 20d do not have a short circuit. In an equivalent circuit shown in FIG. 3, it is assumed that a short-circuit resistance $R_5$ of the short-circuit current shunt part 10 and a short-circuit resistance $R_6$ of the electric elements 20a and 20b are the same ($R_5=R_6$). It is also assumed that the electric elements 20c and 20d not having a short circuit keep a large value as its resistance $R_6$, and supply of power to the outside from the electric elements 20c and 20d continues via the tabs. In such a case, if $R_1+R_2$, the sum of the electrical resistance $R_1$ of the first current collector tab 11a of the short-circuit current shunt part 10 and the electrical resistance $R_2$ of the second current collector tab 12a, is smaller than $R_3+R_4$, the sum of the electrical resistance $R_3$ of the cathode current collector tab 21a and the electrical resistance $R_4$ of the anode current collector tab 25a, a large amount of rounding current flows from the electric elements 20c and 20d to the short-circuit current shunt part 10. That is, the stacked battery 100 can hold down the amount of current that flows in the electric element 20, and can inhibit a temperature increase of the electric element 20, in nailing.

2. Specific Example of Current Collector Tab

Hereinafter a preferable specific example of the current collector tabs that have the above-described functions and effects will be shown.

2.1. First Embodiment

Figure 4A:
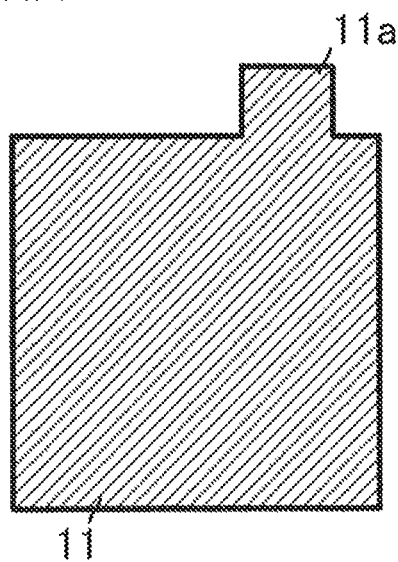
FIGS. 4A to 4D are schematic views to explain an example (first embodiment) of current collector tabs provided to a short-circuit current shunt part 10 and an electric element 20.
Figure 4B:
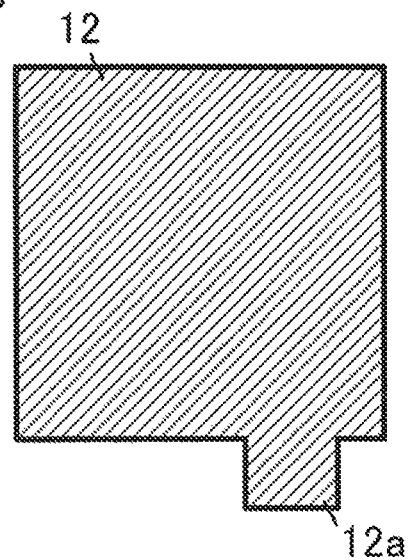
Figure 4C:
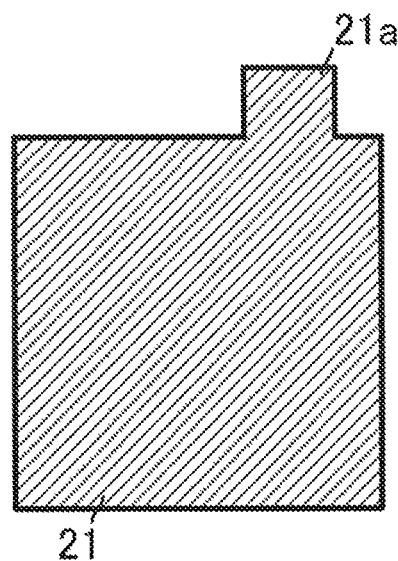
Figure 4D:
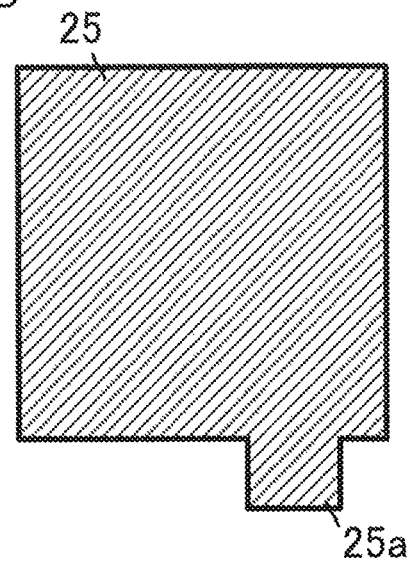

FIGS. 4A to 4D show an example of the current collector layer and the current collector tab according to a first embodiment. FIGS. 4A to 4D show an example of the shape of the current collector layer and the current collector tab seen from the vertical direction of the sheet of FIG. 1. FIGS. 4A and 4B show an example of the shape of the first current collector layer 11 and the second current collector layer 12 of the short-circuit current shunt part 10. FIGS. 4C and 4D show an example of the shape of the cathode current collector layer 21 and the anode current collector layer 25 of the electric element 20.

As shown in FIGS. 4A to 4D, the current collector layers 11, 12, 21, and 25 have the current collector tabs 11a, 12a, 21a, and 25a, respectively, at a part of the outer edge. Here, a specific resistance of the first current collector tab 11a is smaller than a specific resistance of the cathode current collector tab 21a, and a specific resistance of the second current collector tab 12a is smaller than a specific resistance of the anode current collector tab 25a. This makes the electrical resistance of the first current collector tab 11a smaller than the electrical resistance of the cathode current collector tab 21a, and the electrical resistance of the second current collector tab 12a smaller than the electrical resistance of the anode current collector tab 25a. The following Table 1 shows examples of materials of the current collector tabs and the specific resistances of the materials.

TABLE 1

|  | Specific resistance ($10^{-6}$ Ω · cm) |
|---|---|
| Al | 2.65 |
| Al alloy (A3003) | 3.45 |
| Cu | 1.72 |
| Fe | 9.7 |
| Stainless steel (SUS304) | 72 |
| Ti | 55 |
| Au | 2.19 |
| Ag | 1.62 |

As in Table 1, for example, using the first current collector tab 11a formed of aluminum (Al) and the cathode current collector tab 21a formed of stainless steel (SUS304), can easily make the electrical resistance of the first current collector tab 11a smaller than the electrical resistance of the cathode current collector tab 21a. For the combination of the second current collector tab 12a and the anode current collector tab 25a, a material of small specific resistance may be used for the second current collector tab 12a, and a material of large specific resistance may be used for the anode current collector tab 25a. This can flow a larger amount of rounding current into the short-circuit current shunt part 10 than in the electric element 20, when a short circuit occurs in nailing, and can reduce Joule heat in the electric element 20, which can inhibit a temperature increase of the electric element 20.

In the first embodiment, the thickness and shape of the current collector tabs 11a, 12a, 21a, and 25a may be the same. Thus, a same forming and processing means may be used for the current collector tabs 11a, 12a, 21a, and 25a, and positions of the layers in stacking may be easily determined.

2.2. Second Embodiment

Figure 5:
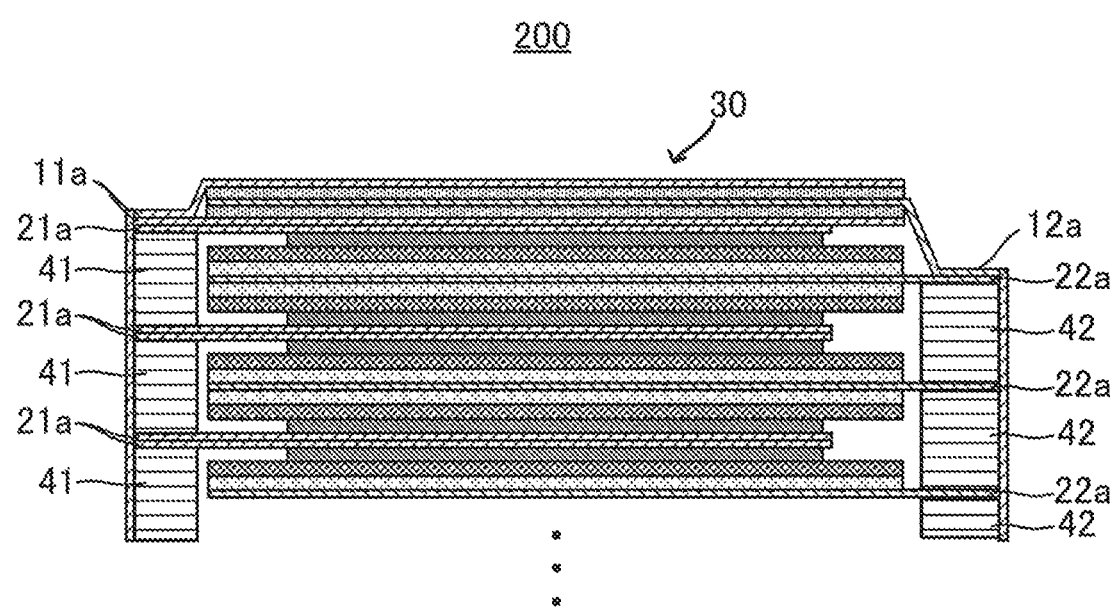
FIG. 5 is a schematic view to explain an example (second embodiment) of the current collector tabs provided to the short-circuit current shunt part 10 and the electric element 20.

FIG. 5 shows an example of the current collector tab according to a second embodiment. As shown in FIG. 5, in a stacked battery 200, a plurality of cathode current collector tabs 21a, 21a, . . . and anode current collector tabs 25a, 25a, . . . have portions projecting from a stack 30. A layer 41, formed of a material of larger specific resistance than the cathode current collector tab 21a, is provided between the portions of the cathode current collector tabs 21a, 21a, . . . . A layer 42, formed of a material of larger specific resistance than the anode current collector tab 25a, is provided between the portions of the anode current collector tabs 25a, 25a, . . . .

In the second embodiment, providing, between the current collector tabs 21a, 21a, . . . and the current collector tabs 25a, 25a, . . . of the electric element 20, the layers 41 and 42 formed of materials of large specific resistance increase the electrical resistance of the current collector tab 21a and the electrical resistance of the current collector tab 25a. That is, even if the materials (specific resistances) of the current collector tabs 11a, 12a, 21a, and 25a are the same, the layers 41 and 42 can make the electrical resistance of the current collector tabs 11a and 12a smaller than the electrical resistance of the current collector tabs 21a and 25a. This can flow a larger amount of rounding current into the short-circuit current shunt part 10 than in the electric element 20, when a short circuit occurs in nailing, and can reduce a generation of Joule heat in the electric element 20, which can inhibit a temperature increase of the electric element 20. The stacked battery 200 has an advantage that a same material can be used for the current collector tabs 11a, 12a, 21a, and 25a.

The layers 41 and 42 provided between the current collector tabs 21a, 21a, . . . and the current collector tabs 25a, 25a, . . . of the electric element 20 may be joined to the current collector tabs for example by welding. In this case, as described later, it is possible to change the electrical resistance of the current collector tabs by changing the value of the area where the layers 41 and 42 are joined to the current collector tabs.

In the stacked battery 200, the current collector tabs 21a and 25a do not have to be collected and bundled. That is, there is no need to bend the current collector tabs 21a, 21a, . . . , and current collector tabs 25a, 25a, . . . . Thus, the active materials can avoid from slipping off due to the collection and bundling, and dead space due to the collection and bundling can decrease.

2.3. Third Embodiment

FIGS. 6A to 6C show an example of the current collector tabs according to a third embodiment. FIG. 6A shows a layer structure of a stacked battery 300, FIG. 6B shows an expanded structure of the stacked battery 300 on a side of the first current collector tab 11a and the cathode current collector tab 21a. FIG. 6C shows an expanded structure of the stacked battery 300 on a side of the second current collector tab 12a and the anode current collector tab 25a.

As shown in FIGS. 6A to 6C, the stacked battery 300 has a plurality of short-circuit current shunt parts 10, 10, . . . . A plurality of first current collector tabs 11a, 11a, . . . and the second current collector tabs 12a, 12a, . . . have portions projecting from the stack 30 of the stacked battery 300. In the stacked battery 300, a layer 51 formed of the same material as the first current collector tab 11a is provided between the portions of the first current collector tabs 11a, 11a, . . . . The layer 51 is joined to the current collector tabs 11a, 11a, . . . by welding. A layer 61, formed of the same material as the second current collector tab 12a, is also provided between the portions of the second current collector tabs 12a, 12a, . . . . The layer 61 is joined to the second current collector tabs 12a, 12a, . . . by welding. In the stacked battery 300, as in the stacked battery 200, the cathode current collector tabs 21a, 21a, . . . and the anode current collector tabs 25a, 25a, . . . have portions projecting from the stack 30. A layer 52, formed of the same material as the cathode current collector tab 21a, is provided between the portions of the cathode current collector tabs 21a, 21a, . . . . The layer 52 is joined to the cathode current collector tabs 21a, 21a, . . . by welding. A layer 62, formed of the same material as the anode current collector tab 25a, is provided between the portions of the anode current collector tabs 25a, 25a, . . . . The layer 62 is joined to the anode current collector tabs 25a, 25a, . . . by welding. A feature of such a stacked battery 300 is that the welded area of the first current collector tab 11a is larger than the welded area of the cathode current collector tab 21a, and the welded area of the second current collector tab 12a is larger than the welded area of the anode current collector tab 25a. That is, the area where the first current collector tab 11a and the layer 51 are joined is larger than the area where the cathode current collector tab 21a and the layer 52 are joined, and the area where the second current collector tab 12a and the layer 61 are joined is larger than the area where the anode current collector tab 25a and the layer 62 are joined.

In the stacked battery 300 for example, as shown in FIGS. 6A to 6C, the number of weld between the first current collector tab 11a and the layer 51 is larger than the number of weld between the cathode current collector tab 21a and the layer 61. This makes the welded area of the first current collector tab 11a (area where the tab 11a and the layer 51 are joined) larger than the welded area of the cathode current collector tab 21a (area where the tab 21a and the layer 61 are joined). The number of weld between the second current collector tab 12a and the layer 52 is larger than the number of weld between the anode current collector tab 25a and the layer 62. This makes the welded area of the second current collector tab 12a (area where the tab 12a and the layer 52 are joined) larger than the welded area of the anode current collector tab 25a (area where the tab 25a and the layer 62 are joined). Making the welded area of the first current collector tab 11a and the second current collector tab 12a larger than the welded area of the cathode current collector tab 21a and the anode current collector tab 25a can make the electrical resistance of the current collector tabs 11a and 12a smaller than the electrical resistance of the current collector tabs 21a and 25a. This can flow a larger amount of rounding current into the short-circuit current shunt part 10 than in the electric element 20 when a short circuit occurs in nailing, which can reduce Joule heat in the electric element 20 and inhibit a temperature increase in the electric element 20.

In the stacked battery 300, as shown in FIG. 6C, a layer 63 may be provided between the second current collector tab 12a and the anode current collector tab 25a. They may be joined by welding. The material of the layer 63 is not limited to particular type. For example, the layer 63 may be formed of the same material as the second current collector tab 12a, and may be formed of the same material as the anode current collector tab 25a. A layer (not shown) may be provided between the first current collector tab 11a and the cathode current collector tab 21a. They may be joined by welding as well.

In the stacked battery 300, the layers 51, 52, 61, and 62 are formed of the same material as the current collector tabs 11a, 12a, 21a, and 25a. Then, the stacked battery 300 has advantages that the joint strength of the current collector tabs 11a, 12a, 21a, and 25a, and the layers 51, 52, 61, and 62 is high, and there is no need to concern about corrosion etc. due to joining of different materials.

As in the stacked battery 200, collection and bundling of the current collector tabs 21a and 25a is not needed in the stacked battery 300. Collection and bundling of the current collector tabs 11a and 12a is not needed either. That is, there is no need to bend the current collector tabs, which can avoid the active materials from slipping off due to the collection and bundling, and can decrease the dead space created by the collection and bundling.

2.4. Fourth Embodiment

Figure 7:
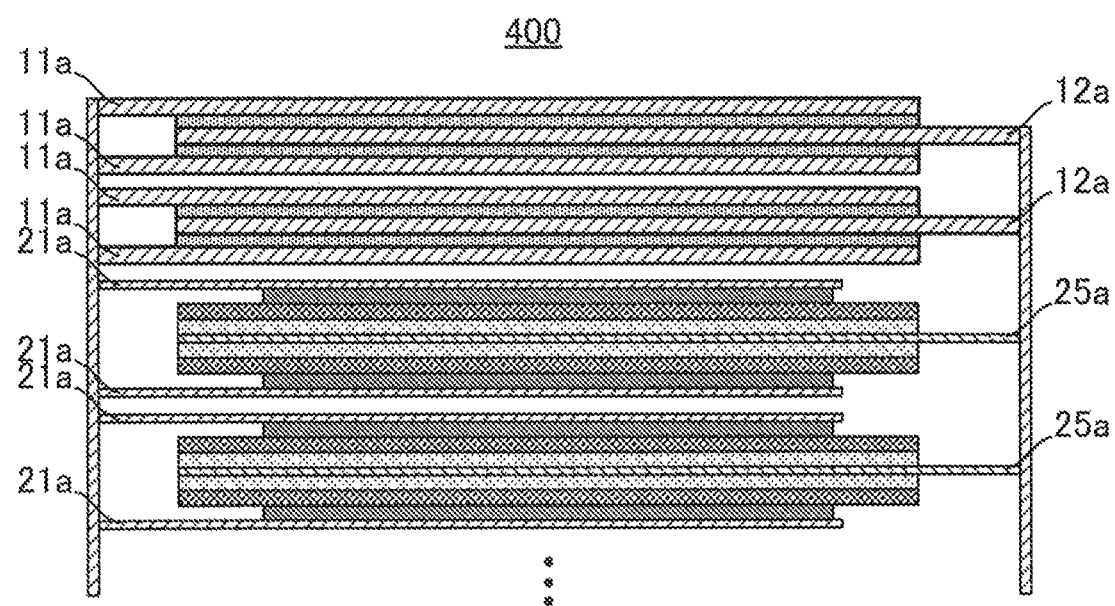
FIG. 7 is a schematic view to explain an example (fourth embodiment) of the current collector tabs provided to the short-circuit current shunt part 10 and the electric element 20.

FIG. 7 shows an example of the current collector tabs according to a fourth embodiment. As shown in FIG. 7, in a stacked battery 400, the first current collector tab 11a is larger than the cathode current collector tab 21a in thickness, and the second current collector tab 12a is larger than the anode current collector tab 25a in thickness. This makes the electrical resistance of the current collector tabs 11a and 12a smaller than the electrical resistance of the current collector tabs 21a and 25a. Thus, a larger amount of rounding current can flow in the short-circuit current shunt part 10 than in the electric element 20 when a short circuit occurs in nailing, which can reduce Joule heat in the electric element 20 and can hold down the temperature in the electric element 20. The fourth embodiment also has the advantage that a same material can be used for the current collector tabs 11a, 12a, 21a, and 25a.

In FIG. 7, the current collector layers and the current collector tabs have a same thickness. However, the thickness of the current collector tabs may be larger than the thickness of the current collector layers. It is noted that the thickness of the current collector tabs is preferably the same as the thickness of the current collector layers, in view of easily forming and processing the current collector tabs. In such a case, the total thickness of the stacked battery increases, which decreases the volume energy density.

2.5. Fifth Embodiment

Figure 8A:
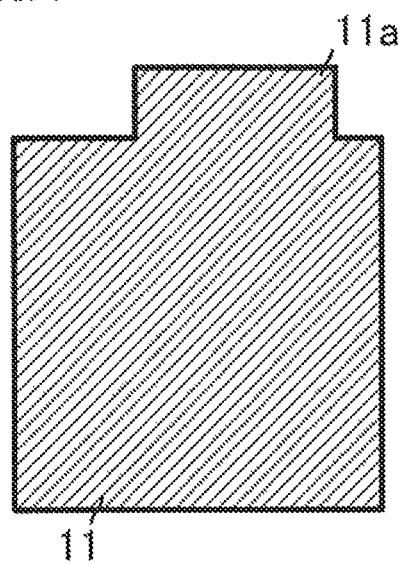
FIGS. 8A to 8D are schematic views to explain an example (fifth embodiment) of the current collector tabs provided to the short-circuit current shunt part 10 and the electric element 20.
Figure 8B:
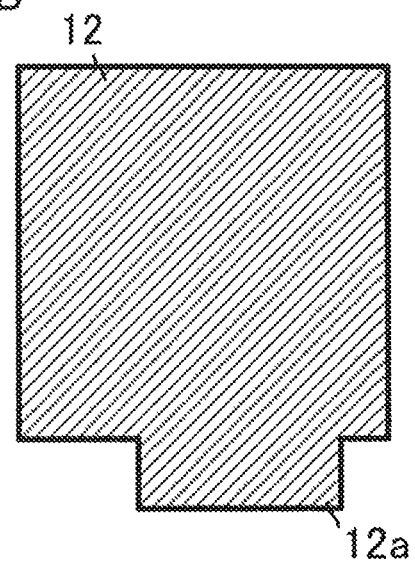
Figure 8C:
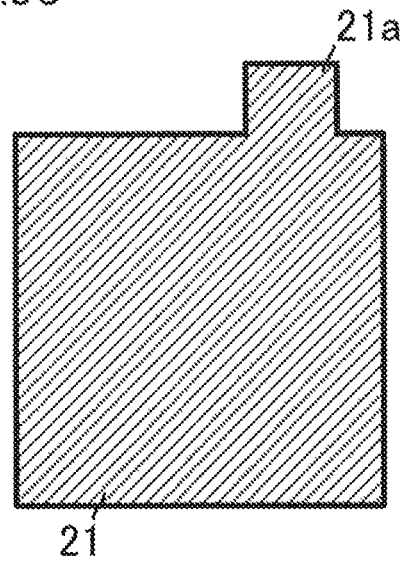
Figure 8D:
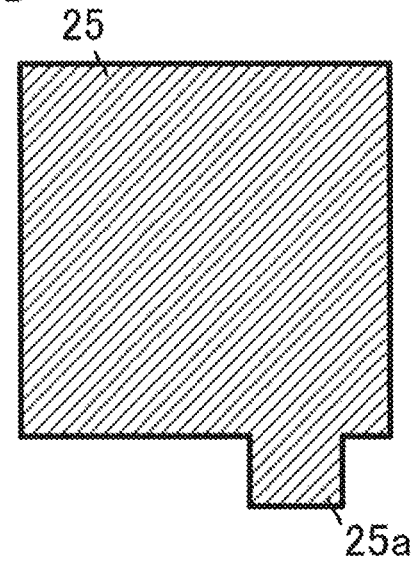

FIGS. 8A to 8D show an example of the current collector layers and the current collector tabs according to a fifth embodiment. FIGS. 8A to 8D show a shape of the current collector layers and the current collector tabs seen in the vertical direction of the sheet of FIG. 1. FIGS. 8A and 8B show an example of the shape of the first current collector layer 11 and the first current collector tab 11a, and the shape of the second current collector layer 12 and the second current collector tab 12a of the short-circuit current shunt part 10. FIGS. 8C and 8D show an example of the shape of the cathode current collector layer 21 and the cathode current collector tab 21a, and the shape of the anode current collector layer 25 and the anode current collector tab 25a of the electric element 20. As shown in FIGS. 8A to 8D, in the current collector layers and current collector tabs according to the fifth embodiment, the first current collector tab 11a is larger in width than the cathode current collector tab 21a, and the second current collector tab 12a is smaller in width than the anode current collector tab 25a. This makes the electrical resistance of the current collector tabs 11a and 12a smaller than the electrical resistance of the current collector tabs 21a and 25a. Thus, a larger amount of rounding current can flow in the short-circuit current shunt part 10 than in the electric element 20 when a short circuit occurs in nailing, which can reduce Joule heat and hold down the temperature in the electric element 20. The fifth embodiment also has the advantage that a same material can be used for the current collector tabs 11a, 12a, 21a, and 25a. The total thickness of the stacked battery does not increase in the fifth embodiment, which is different from the fourth embodiment, and then the volume energy density easily increases.

The stacked battery of the present disclosure can flow a larger amount of rounding current in the short-circuit current shunt part than in the electric element when a short circuit occurs in nailing, because the sum of the electrical resistance of the first current collector tab and the electrical resistance of the second current collector tab is smaller than the sum of the electrical resistance of the cathode current collector tab and the electrical resistance of the anode current collector tab.

3. Method of Producing Stacked Battery

Figure 9:
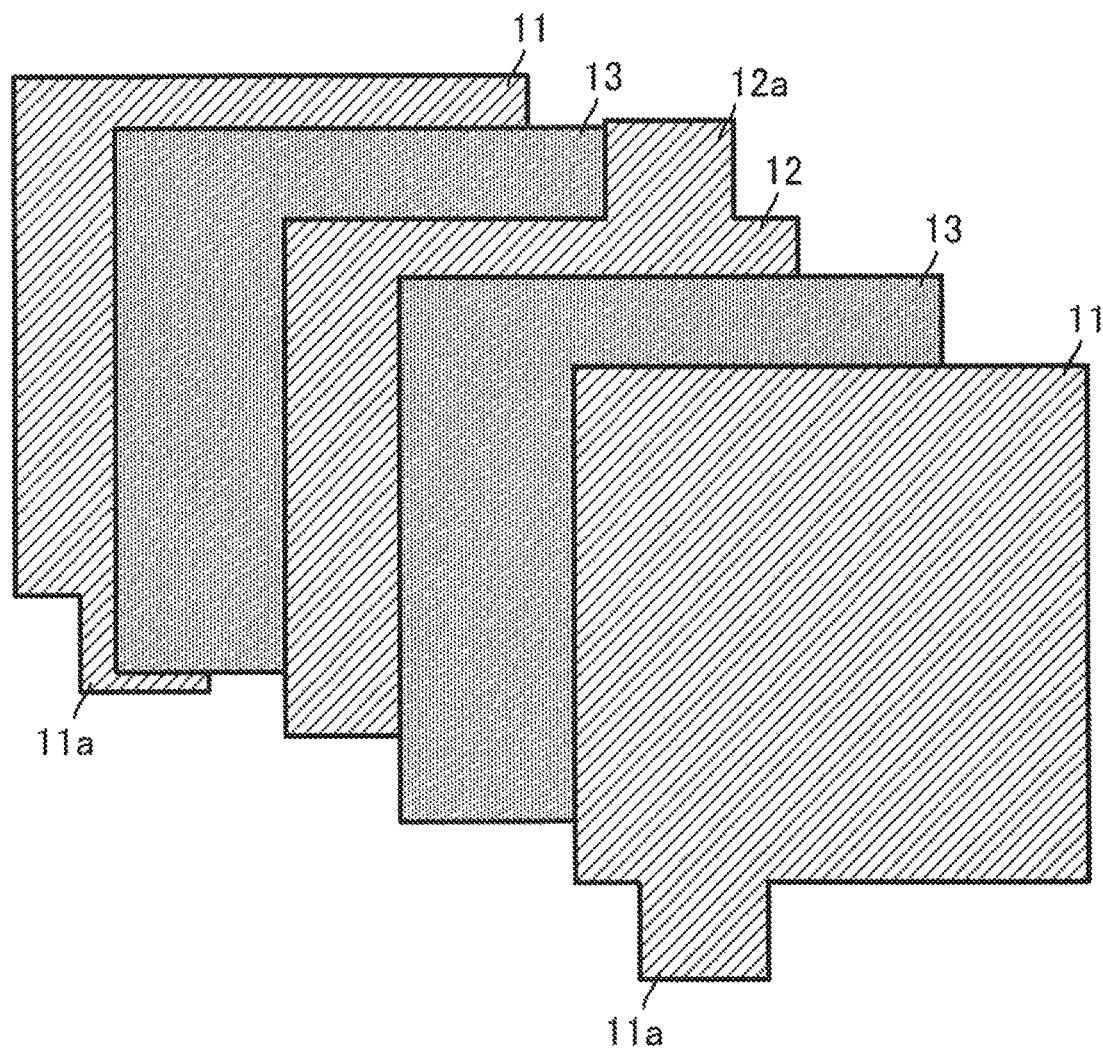
FIG. 9 is a schematic view to explain an example of materials that form the short-circuit current shunt part 10.

The short-circuit current shunt part 10 may be easily produced by providing the insulating layer 13 (e.g. insulation film) between the first current collector layer 11 (e.g. metal foil) and the second current collector layer 12 (e.g. metal foil). As shown in FIG. 9, two insulating layers 13 and 13 may be provided over the both faces of the second current collector layer 12, and the first current collector layer 11 may be provided over a face of each insulating layer 13 opposite to the second current collector layer 12. Here, the layers may be adhered to each other by adhesive, resin, etc. to keep the shape of the short-circuit current shunt part 10. In this case, the adhesive etc. does not have to be applied to the whole face of each layer, as long as it is applied to part of surface of each layer.

The electric element 20 may be produced by a known method. For example, when an all-solid-state battery is produced, the electric element 20 may be produced by: applying a cathode material over a surface of the cathode current collector layer 21 by wet method and drying the obtained material to form the cathode material layer 22; applying an anode material over a surface of the anode current collector layer 25 by wet method and drying the obtained material to form the anode material layer 24; transcribing the solid electrolyte layer 23 including a solid electrolyte etc. between the cathode material layer 21 and the anode material layer 24; and press-molding them to unify them. The pressure to press the layers is not limited to particular values, and for example, preferably no less than 2 ton/cm². The above production steps are an example, and the electric element 20 may be produced by a method other than the above steps. For example, the cathode material layer etc. may be produced by dry method, instead of wet method.

The short-circuit current shunt part 10 produced as above and the electric elements 20, 20, . . . may be electrically connected, and the electric elements 20, 20, . . . may be electrically connected in parallel to each other, by: stacking the short-circuit current shunt part 10 to the electric elements 20, 20, . . . ; electrically connecting the tab 11a of the first current collector layer 11 to the cathode current collector layer 21; electrically connecting the tab 12a of the second current collector layer 12 to the anode current collector layer 25; electrically connecting the tabs 21a, 21a, . . . of the cathode current collector layers 21, 21, . . . to each other; and electrically connecting the tabs 25a, 25a, . . . of the anode current collector layers 25, 25, . . . to each other. At this time, the sum of the electrical resistance of the first current collector tab 11a and the electrical resistance of the second current collector tab 12a may be smaller than the sum of the electrical resistance of the cathode current collector tab 21a and the electrical resistance of the anode current collector tab 25a, by adjusting the shapes of the tabs, connection forms, etc., as described. A stacked battery may be produced by vacuum-sealing the stack 30 electrically connected as above into a battery case, such as laminate film and stainless steel can. These production steps are an example, and the stacked battery may be produced by steps other than the above steps.

Or, an electrolyte solution battery may be produced as the stacked battery, by: arranging a separator instead of the above-described solid electrolyte layer; producing a stack electrically connected as described above; and sealing the stack into a battery case filled with an electrolyte solution. In producing an electrolyte solution battery, press molding of each layer may be omitted.

4. Supplementary Note

In the above description, the short-circuit current shunt part is formed of one first current collector layer, two insulating layers, and one second current collector layer. However, the stacked battery of the present disclosure is not limited to this structure. The short-circuit current shunt part only needs to have an insulating layer between the first current collector layer and the second current collector layer, and the number of each layer is not limited to particular values.

In the above description, two electric elements share one anode current collector layer. However, the stacked battery of the present disclosure is not limited to this structure. The electric element may be any element that functions as a single battery, and that has a cathode current collector layer, a cathode material layer, an electrolyte layer, an anode material layer, and an anode current collector layer stacked together.

In the above description, the stacked battery has one or two short-circuit current shunt part(s) 10. However, the number of the short-circuit current shunt part 10 is not limited to these values. The stacked battery may have three or more short-circuit current shunt parts 10, 10, . . . .

In the above description, the directions of stacking all layers are the same, as in the most preferable embodiment. However, the stacked battery of the present disclosure is not limited to this embodiment. Any one or more of the direction of stacking the cathode current collector layer etc. in the electric element, the direction of stacking the plurality of electric elements, the direction of stacking the first current collector layer etc. of the short-circuit current shunt part, and the direction of stacking the short-circuit current shunt part and the electric elements, may be different.

In the above description, a plurality of electric elements are stacked. Even a stacked battery not including a plurality of electric elements stacked together (single battery) can exert a certain amount of effect. However, the above-described Joule heat is easier to increase in a stacked battery including a plurality of electric elements stacked each other, than in a stacked battery in which only one electric element is provided. That is, more remarkable effect is exerted in a configuration in which a plurality of electric elements are stacked. This point is an advantage of stacking electric elements in a stacked battery.

In the above description, the stacked battery includes both an electrolyte solution battery and an all-solid-state battery. However, the technique of the present disclosure is more effective when the stacked battery is an all-solid-state battery. All-solid-state batteries have less gaps in the electric element than electrolyte solution batteries, and a pressure to be applied to the electric element is higher in all-solid-state batteries when a nail penetrates the electric element in nailing, than in electrolyte solution batteries. Thus, the short-circuit resistance of the electric element decreases and a large amount of rounding current easily flows when a short circuit occurs in all-solid-state batteries. Further, restraint pressure may be applied to the electric element to reduce the internal resistance of the electric element, when the stacked battery is an all-solid-state battery. In this case, the restraint pressure is applied to the direction of stacking the electric element (direction from the cathode current collector layer to the anode current collector layer), and the sum of the pressure by nail and the restraint pressure is applied to the electric element in nailing. Thus, the cathode current collector layer and the anode current collector layer easily have contact with each other to short-circuit, and the short-circuit resistance of the electric element easily decreases. Thus, it is considered a remarkable effect of providing the short-circuit current shunt part to shunt rounding current is exerted in all-solid-state batteries. On the other hand, in electrolyte solution batteries, their battery cases are usually filled with electrolyte solution, in which each layer is immersed in the electrolyte solution, and the electrolyte solution is provided to the gaps between each layer. Then, the pressure to be applied by a nail in nailing is small, and the short-circuit resistance of the electric element increases. Thus, the amount of rounding current that flows in some electric elements of electrolyte solution batteries might be smaller than that in all-solid-state batteries. Then, the effect of providing the short-circuit current shunt part in electrolyte solution batteries is considered to be relatively small compared to the effect in all-solid-state batteries. Further, the current collector tabs and the like of electrolyte solution batteries need to be formed of materials that do not react with the electrolyte solution. On the other hand, all-solid-state batteries do not have such a problem. From the above, the stacked battery of the present application is preferably an all-solid-state battery.

When the electric elements are connected to each other electrically in series via a bipolar electrode, nailing to some electric elements causes a rounding current to flow from other electric elements to some electric elements via the nail. That is, the rounding current flows via the nail of high contact resistance, and the amount of current to flow is small. When the electric elements are connected to each other electrically in series via a bipolar electrode, the rounding current is the largest when all the electric elements are nailed. In such a case, discharge of the electric elements has already sufficiently progressed, and then the temperature of some electric elements is difficult to increase locally. On the other hand, when the electric elements are connected electrically in parallel, the problem of local increase in temperature of some electric elements easily occurs, because a rounding current concentrates to some electric elements via tabs etc., when some electric elements have a short circuit in nailing. As described above, the technique of the present application is to solve a problem that occurs particularly in a battery where the electric elements are connected to each other electrically in parallel. Then the technique of the present application exerts a particularly remarkable effect in a battery where the electric elements are connected to each other electrically in parallel.

In the above explanation, the short-circuit resistance of the short-circuit current shunt part ($R_5$ in FIG. 3) and the short-circuit resistance of the electric element ($R_6$ in FIG. 3) in nailing are presumed to be nearly the same. The large/small relation in value between the short-circuit resistance of the short-circuit current shunt part and the short-circuit resistance of the electric element is non-essential matter of the technique of the present application and not particularly limited. For example, setting the short-circuit resistance of the short-circuit current shunt part smaller than the short-circuit resistance of the electric element in nailing can flow a larger amount of rounding current in the short-circuit current shunt part than in the electric element. However, the short-circuit resistance of the short-circuit current shunt part and the short-circuit resistance of the electric element might change in accordance with the conditions of nailing etc., and some measures are needed to keep their large/small relation in value. As mentioned above, the electrical resistance of the current collector tabs can be easily controlled by changing the materials (specific resistance), shapes, etc., of the current collector tabs, and then the large/small relation in value of the electrical resistances of the current collector tabs can be easily kept both in nailing and in normal use. In this point, the technique of the present disclosure is completed, to solve the above problems, from a viewpoint different from a viewpoint of short-circuit resistance of the short-circuit current shunt part and the short-circuit resistance of the electric element.

INDUSTRIAL APPLICABILITY

The stacked battery of the present application may be suitably used as a large on-board power source for vehicles, for example.

REFERENCE SIGNS LIST 10 short-circuit current shunt part
11 first current collector layer
11a first current collector tab
12 second current collector layer
12a second current collector tab
13 insulating layer
20 electric element
21 cathode current collector layer
21a cathode current collector tab
22 cathode material layer
23 electrolyte layer
24 anode material layer
25 anode current collector layer
25a anode current collector tab
30 stack
41 layer formed of a material larger in specific resistance than cathode current collector tab
42 layer formed of a material larger in specific resistance than anode current collector tab
51 layer formed of the same material as the first current collector tab
52 layer formed of the same material as the second current collector tab
61 layer formed of the same material as the cathode current collector tab
62 layer formed of the same material as the anode current collector tab
100 stacked battery

What is claimed is:

1. A stacked battery comprising a stack of: at least one short-circuit current shunt part; and a plurality of electric elements,
wherein:
the short-circuit current shunt part comprises a first current collector layer, a first insulating layer, a second current collector layer, a second insulating layer, and another first current collector, all these layers being stacked in that order;
each of the first current collector layer comprises a first current collector tab;
the second current collector layer comprises a second current collector tab;
each electric element comprises a cathode current collector layer, a cathode material layer, an electrolyte layer, an anode material layer, and an anode current collector layer, all these layers being stacked each other;
the cathode current collector layer comprises a cathode current collector tab;
the anode current collector layer comprises an anode current collector tab;
the electric elements are connected to each other electrically in parallel by an electrical connection of a plurality of the cathode current collector tabs and an electrical connection of a plurality of the anode current collector tabs;
each of the first current collector layer is electrically connected to the cathode current collector layer via the first current collector tab;
the second current collector layer is electrically connected to the anode current collector layer via the second current collector tab; and
a sum of an electrical resistance of the first current collector tab and an electrical resistance of the second current collector tab is smaller than a sum of an electrical resistance of the cathode current collector tab and an electrical resistance of the anode current collector tab.

2. The stacked battery according to claim 1, wherein a specific resistance of the first current collector tab is smaller than a specific resistance of the cathode current collector tab, and a specific resistance of the second current collector tab is smaller than a specific resistance of the anode current collector tab.

3. The stacked battery according to claim 1,
wherein:
the cathode current collector tabs and the anode current collector tabs have portions projecting from the stack;
a layer formed of a material larger in specific resistance than the cathode current collector tab is provided between the portions of the cathode current collector tabs; and
a layer formed of a material lager in specific resistance than the anode current collector tab is provided between the portions of the anode current collector tabs.

4. The stacked battery according to claim 1, comprising a plurality of the short-circuit current shunt parts,
wherein:
the first current collector tabs and the second current collector tabs have portions projecting from the stack;
a layer formed of a same material as the first current collector tab is provided between the portions of the first current collector tabs, and the layer is joined to the first current collector tabs by welding;
a layer formed of a same material as the second current collector tab is provided between the portions of the second current collector tabs, and the layer is joined to the second current collector tabs by welding;
the cathode current collector tabs and the anode current collector tabs have portions projecting from the stack;
a layer formed of a same material as the cathode current collector tab is provided between the portions of the cathode current collector tabs, and the layer is joined to the cathode current collector tabs by welding;
a layer formed of a same material as the anode current collector tab is provided between the portions of the anode current collector tabs, and the layer is joined to the anode current collector tabs by welding;

an area where the first current collector tab is welded is larger than an area where the cathode current collector tab is welded; and an area where the second current collector tab is welded is larger than an area where the anode current collector tab is welded.

5. The stacked battery according to claim 1, wherein the first current collector tab is larger than the cathode current collector tab in thickness, and the second current collector tab is larger than the anode current collector tab in thickness.

6. The stacked battery according to claim 1, wherein the first current collector tab is larger than the cathode current collector tab in width, and the second current collector tab is larger than the anode current collector tab in width.

7. The stacked battery according to claim 1, wherein two electric elements share one anode current collector layer, and wherein the cathode current collector layer, the cathode material layer, the electrolyte layer, the anode material layer, the anode current collector layer, another anode material layer, another electrolyte layer, another cathode material layer, and another cathode current collector layer are directly stacked in that order.

* * * * *